(12) United States Patent
Hattori et al.

(10) Patent No.: US 6,768,596 B2
(45) Date of Patent: Jul. 27, 2004

(54) CLICK-STOP MECHANISM PROVIDED BETWEEN TWO RELATIVELY SLIDABLE MEMBERS

(75) Inventors: Kazuhiro Hattori, Chiba (JP); Hiroaki Suzuki, Saitama (JP); Kazuhiro Ikuta, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/166,266

(22) Filed: Jun. 11, 2002

(65) Prior Publication Data

US 2002/0187001 A1 Dec. 12, 2002

(30) Foreign Application Priority Data

Jun. 12, 2001 (JP) ........................................ 2001-177139
Feb. 20, 2002 (JP) ........................................ 2002-043173

(51) Int. Cl.⁷ ............................................ G02B 15/14
(52) U.S. Cl. ........................................................ 359/694
(58) Field of Search ........................... 359/694, 700, 359/702, 703, 704

(56) References Cited

U.S. PATENT DOCUMENTS 6,086,266 A * 7/2000 Fujisaki ........................ 396/448
6,323,995 B1 * 11/2001 Takahama et al. ............. 359/371
6,571,068 B2 * 5/2003 Shimizu ........................ 396/379

* cited by examiner

*Primary Examiner*—Ricky Mack
(74) *Attorney, Agent, or Firm*—Greenblum & Bernstein, P.L.C.

(57) ABSTRACT

A click-stop mechanism provided between two members, one of the two members being slidably fitted on the other of the two members, includes an engaging groove formed on one of opposed surfaces of the two members, a leaf spring insertion recess formed on the other of opposed surfaces of the two members, a click member which is engaged in the engaging groove so as to be movable in a direction normal to the sliding movement of the two members, and a leaf spring which is inserted in the leaf spring insertion recess to bias the click member toward the engaging groove.

14 Claims, 8 Drawing Sheets

CLICK-STOP MECHANISM PROVIDED BETWEEN TWO RELATIVELY SLIDABLE MEMBERS

BACKGROUND OF THE INVENTION

1. Field of the Invention

The present invention relates to a click-stop mechanism which is provided between two members, one of which is slidably fitted on the other.

2. Description of the Related Art

FIG. 10 shows a conventional click-stop mechanism provided between two cylindrical members of a photographing lens barrel. The lens barrel is provided with a stationary ring 30, and an AF/MF switch ring 31 fitted on the stationary ring 30 to be slidable thereon in an optical axis direction (in a direction normal to the page of FIG. 10) relative to the stationary ring 30. The AF/MF switch ring 31 can be manually moved between two positions (an AF position and a MF position) in the optical axis direction relative to the stationary ring 30 to select, e.g., between an AF (autofocus) mode and an MF (manual focus) mode of the photographing lens barrel, respectively. The AF/MF switch ring 31 is provided on an inner peripheral surface thereof with an AF-state holding groove (click-stop groove) 31a and an MF-state holding groove (not shown) each of which extends circumferentially about the optical axis.

The photographing lens barrel has a leaf spring 33 with one end thereof fixed to the inner peripheral surface of the stationary ring 30 by a set screw 32. The stationary ring 30 has a radial through hole 34 in which a click ball 35 is engaged. The click ball 35 is held between the AF/MF switch ring 31 and the leaf spring 33 so that the click ball 35 is always pressed against the inner peripheral surface of the AF/MF switch ring 31 by a spring force of the leaf spring 33. With this structure, the AF position and the MF position of the AF/MF switch ring 31 are defined by the engagement of the click ball 35 in the AF-state holding groove and the MF-state holding groove, respectively. In the case of providing the photographing lens barrel with an aperture setting ring having a structure similar to the above described structure of the AF/MF switch ring 31, the AF-state holding groove and the MF-state holding groove are replaced by a series of click-stop grooves 31b (shown by two-dot chain lines in FIG. 10) arranged at predetermined intervals in a circumferential direction of the AF/MF switch ring 31.

However, such a conventional click-stop mechanism increases the number of elements of the photographing lens barrel because at least one set screw 32 is necessary to fix the leaf spring 33 to the stationary ring 30. In addition, it is difficult to fix the leaf spring 33 to the stationary ring 30 because the leaf spring 33 has to be fixed to the stationary ring 30 from inside the stationary ring 30.

In another conventional click-stop mechanism using a compression helical spring instead of a leaf spring, a radially long insertion hole in which the compression helical spring is inserted needs to be secured. However, it is difficult to insert the compression helical spring into the long insertion hole.

SUMMARY OF THE INVENTION

The present invention provides a simple click-stop mechanism provided between two members, one of which is slidably fitted on the other, wherein the number of elements of the click-stop mechanism is small, and the click-stop mechanism can be easily assembled.

For example, a click-stop mechanism can be provided between two members, one of the two members being slidably fitted on the other of the two members, the click-stop mechanism including an engaging groove formed on one of opposed surfaces of the two members, a leaf spring insertion recess formed on the other of opposed surfaces of the two members, a click member which is engaged in the engaging groove so as to be movable in a direction normal to the sliding movement of the two members, and a leaf spring which is inserted in the leaf spring insertion recess to bias the click member toward the engaging groove.

It is desirable for the leaf spring insertion recess to include a pair of support portions formed in the leaf spring insertion recess to support opposite ends of the leaf spring, respectively, and a leaf-spring-deformation allowance portion which is positioned in the leaf spring insertion recess between the pair of support portions to allow the leaf spring to be resiliently deformed.

It is desirable for the other of the opposed surfaces of the two members, on which the leaf spring insertion recess is formed, to include a click member guide portion which allows the click member to move only in directions corresponding to directions of engagement and disengagement of the click member in and out from the engaging groove.

The engaging groove can be a plurality of engaging grooves which are formed on the one of the opposed surfaces of the two members at different positions in a direction of relative movement of the two members, and the click member can be selectively engaged in the plurality of engaging grooves.

The click member can be formed as a spherical click ball.

A portion of the click member which is engaged in the engaging groove can include a substantially semicolumnar portion having a ridge extending substantially in a longitudinal direction of the engaging groove.

Each of the two members can be an annular member provided in a lens barrel.

At least one of the two members is movable relative to the other in an optical axis direction of the lens barrel, and the engaging groove can include a plurality of engaging grooves which are formed on the one of the opposed surfaces of the two members at different positions in the optical axis direction.

The lens barrel can be used as a photographing lens barrel of an autofocus camera, and one of the two members can serve as a switch ring which is moved in the optical axis direction between an AF position and an MF position to change a focusing mode of the autofocus camera between an AF mode and an MF mode, respectively.

At least one of the two members is rotatable about an optical axis of the lens barrel relative to the other, and the engaging groove includes a plurality of engaging grooves which are formed on the one of the opposed surfaces of the two members at different positions in a circumferential direction about the optical axis.

It is desirable for the engaging groove to have a substantially V-shaped cross section.

The pair of support portions can include a pair of stepped portions formed on the one of the opposed surfaces of the two members in the leaf spring insertion recess to respectively support the opposite ends of the leaf spring.

It is desirable for the click member guide portion to include a pair of opposed recesses formed in the leaf spring insertion recess to hold the click member therebetween in the leaf spring insertion recess so that the click member can move only along the pair of opposed recesses.

In another embodiment, a click-stop mechanism is provided between two members, one of the two members being positioned on the other of the two members to be slidable thereon, the click-stop mechanism including two engaging grooves formed on one of opposed surfaces of the two members, a leaf spring insertion hole formed on the other of the opposed surfaces of the two members, a click member which is selectively engaged in one of the two engaging grooves so as to be movable in a direction normal to the sliding movement of the two members, and a leaf spring which is inserted in the leaf spring insertion hole to bias the click member toward one of the two engaging grooves.

The present disclosure relates to subject matter contained in Japanese Patent Application Nos.2001-177139 (filed on Jun. 12, 2001) and 2002-043173 (filed on Feb. 20, 2002) which are expressly incorporated herein by reference in their entireties.

BRIEF DESCRIPTION OF THE DRAWINGS

The present invention will be described below in detail with reference to the accompanying drawings in which.

DESCRIPTION OF THE PREFERRED EMBODIMENTS

Figure 1:
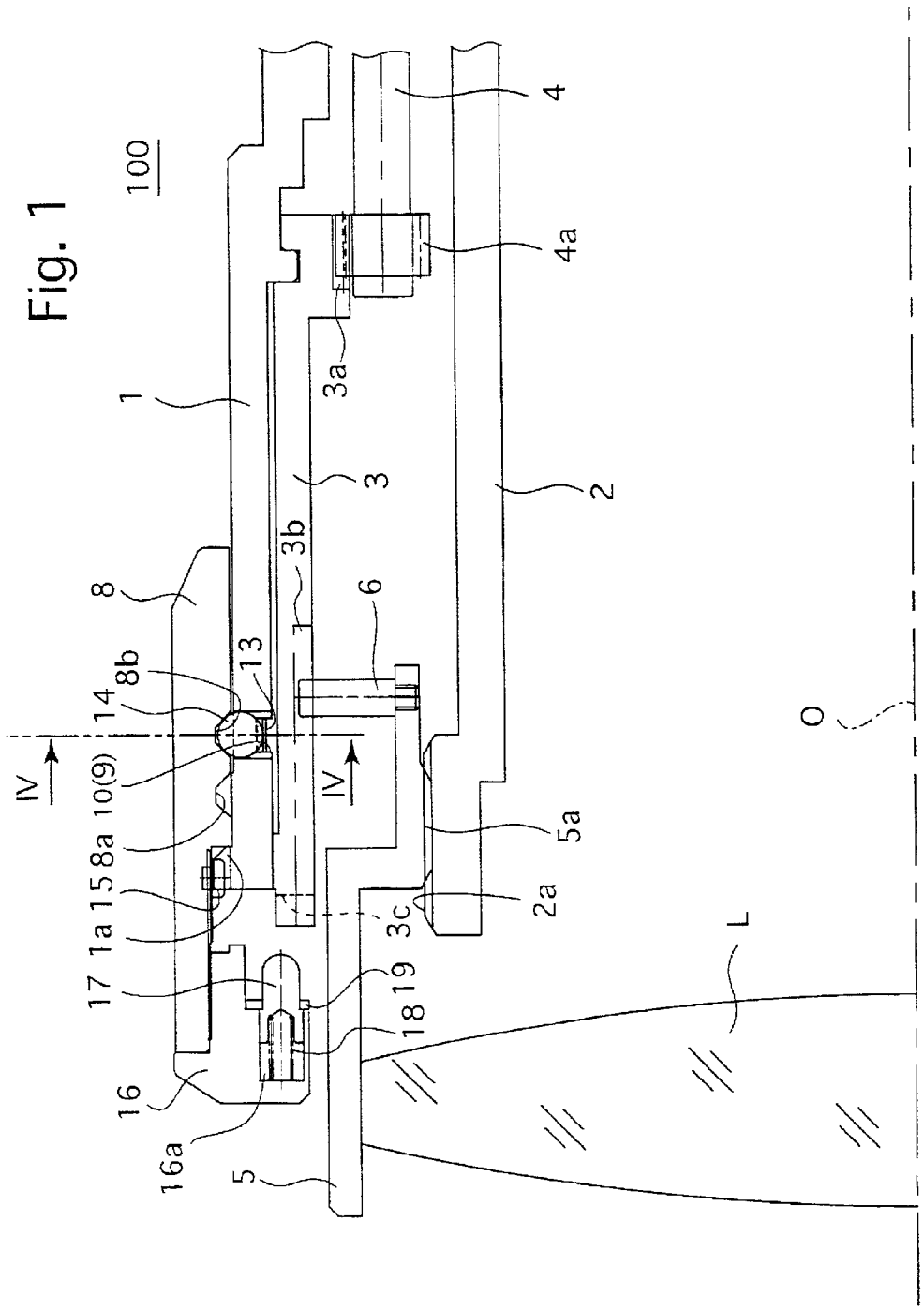
FIG. 1 is an axial cross sectional view of fundamental elements of a photographing lens barrel of an autofocus camera which is provided with a first embodiment of a click-stop mechanism according to the present invention, showing the fundamental elements above a photographing optical axis with an AF/MF switch ring set in the AF position thereof.

FIGS. 1 through 4 show the first embodiment of a click-stop mechanism provided between two annular members (a stationary ring and an AF/MF switch ring) serving as fundamental elements of a photographing lens barrel used for an autofocus camera.

The photographing lens barrel 100 is provided with a first stationary ring 1 and a second stationary ring 2. The second stationary ring 2 is smaller than the first stationary ring 1 in diameter, and is positioned inside the first stationary ring 1. The rear end of each of the first and second stationary rings 1 and 2 is fixed to a stationary member (not shown).

The photographing lens barrel 100 is provided with a rotating ring 3 which is fitted in the first stationary ring 1 to be supported thereby. The rotating ring 3 is supported by the first stationary ring 1 to be rotatable about an optical axis O relative to the first stationary ring 1 and to be immovable in the direction of the optical axis O (i.e., the optical axis direction) relative to the first stationary ring 1. The rotating ring 3 is provided, at the rear end thereof on an inner peripheral surface of the rotating ring 3, with a circumferential gear 3a which is in mesh with a pinion gear 4a fixed on a drive shaft 4. The drive shaft 4 is driven by a motor provided in a camera body (not shown). The drive shaft 4 extends forward from the camera body so that the pinion gear 4a that is fixed on the front end of the drive shaft 4 meshes with the circumferential gear 3a.

The photographing lens barrel 1 is provided between the rotating ring 3 and the second stationary ring 2 with a moving ring 5 which holds a photographing lens group L. The photographing lens group L is supported and surrounded by an inner peripheral surface of the moving ring 5 in the vicinity of the front end thereof. The moving ring 5 is provided at the rear end thereof with a driving force transfer pin 6 which extends radially outwards to be engaged in a rotation transfer groove 3b of the rotating ring 3. The rotation transfer groove 3b is formed on a front part of an inner peripheral surface of the rotating ring 3 to extend in the optical axis direction. The moving ring 5 is provided, on an inner peripheral surface thereof in the vicinity of the rear end of the moving ring 5, with a female thread portion 5a, and the second stationary ring 2 is provided, at the front end thereon on an outer peripheral surface of the second stationary ring 2, with a male thread portion 2a which is in mesh with the female thread portion 5a of the moving ring 5.

Figure 2:
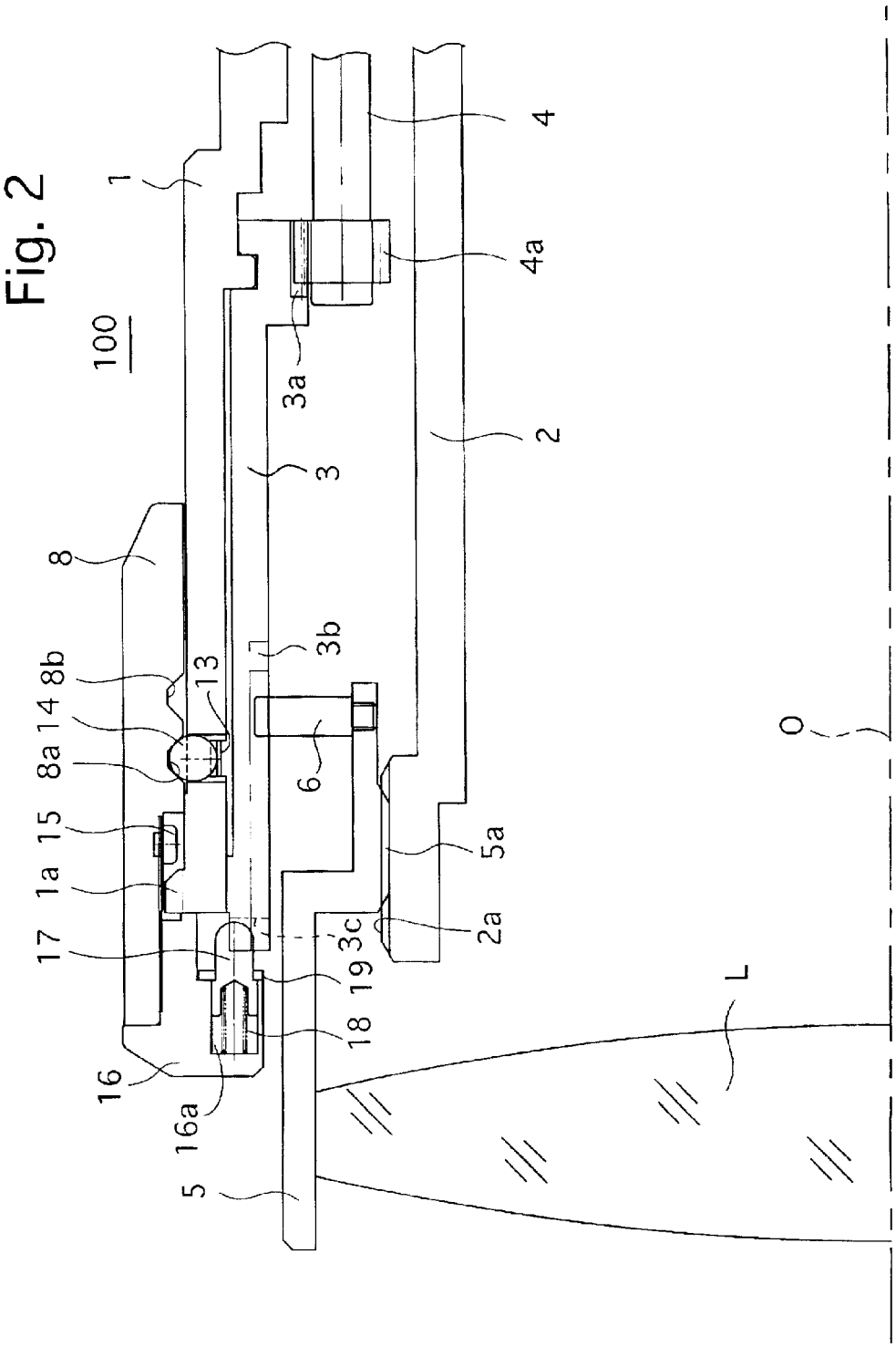
FIG. 2 is a view similar to that of FIG. 1 and shows the fundamental elements above the photographing optical axis with the AF/MF switch ring set in the MF position thereof.

The photographing lens barrel 100 is provided with an AF/MF switch ring 8 which is fitted on the first stationary ring 1 to be rotatable about the optical axis O relative to the first stationary ring 1 and to be movable in the optical axis direction relative to the first stationary ring 1. The AF/MF switch ring 8 is provided on an inner peripheral surface thereof with an MF-state holding groove (engaging groove) 8a and an AF-state holding groove (engaging groove) 8b, each of which extends circumferentially about the optical axis O with a predetermined space therebetween. The MF-state holding groove 8a is positioned in front of the AF-state holding groove 8b in the optical axis direction. The click-stop mechanism according to the first embodiment is provided between the first stationary ring 1 and the AF/MF switch ring 8. As shown in FIGS. 1 and 2, each of the MF-state holding groove 8a and the AF-state holding groove 8b has a substantially V-shaped cross section.

Figure 3:
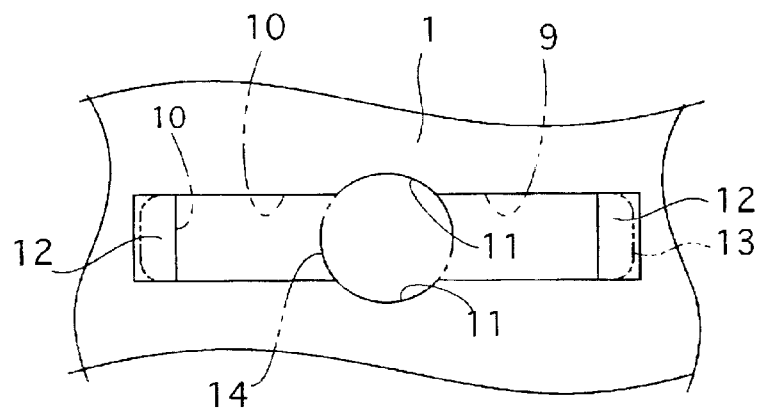
FIG. 3 is an enlarged plan view of a fundamental portion of the click-stop mechanism shown in FIGS. 1 and 2.
Figure 4:
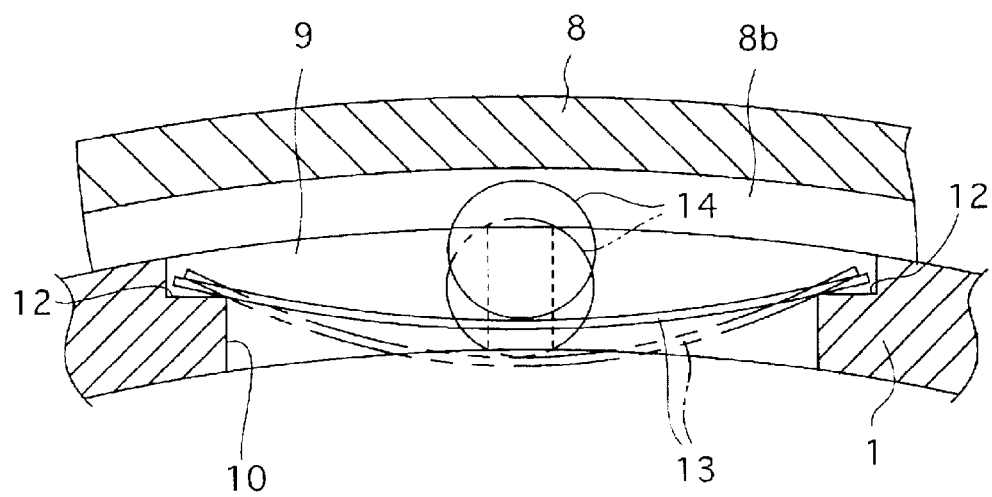
FIG. 4 is a cross sectional view of the click-stop mechanism, taken along IV—IV line shown in FIG. 1.
Figure 5:
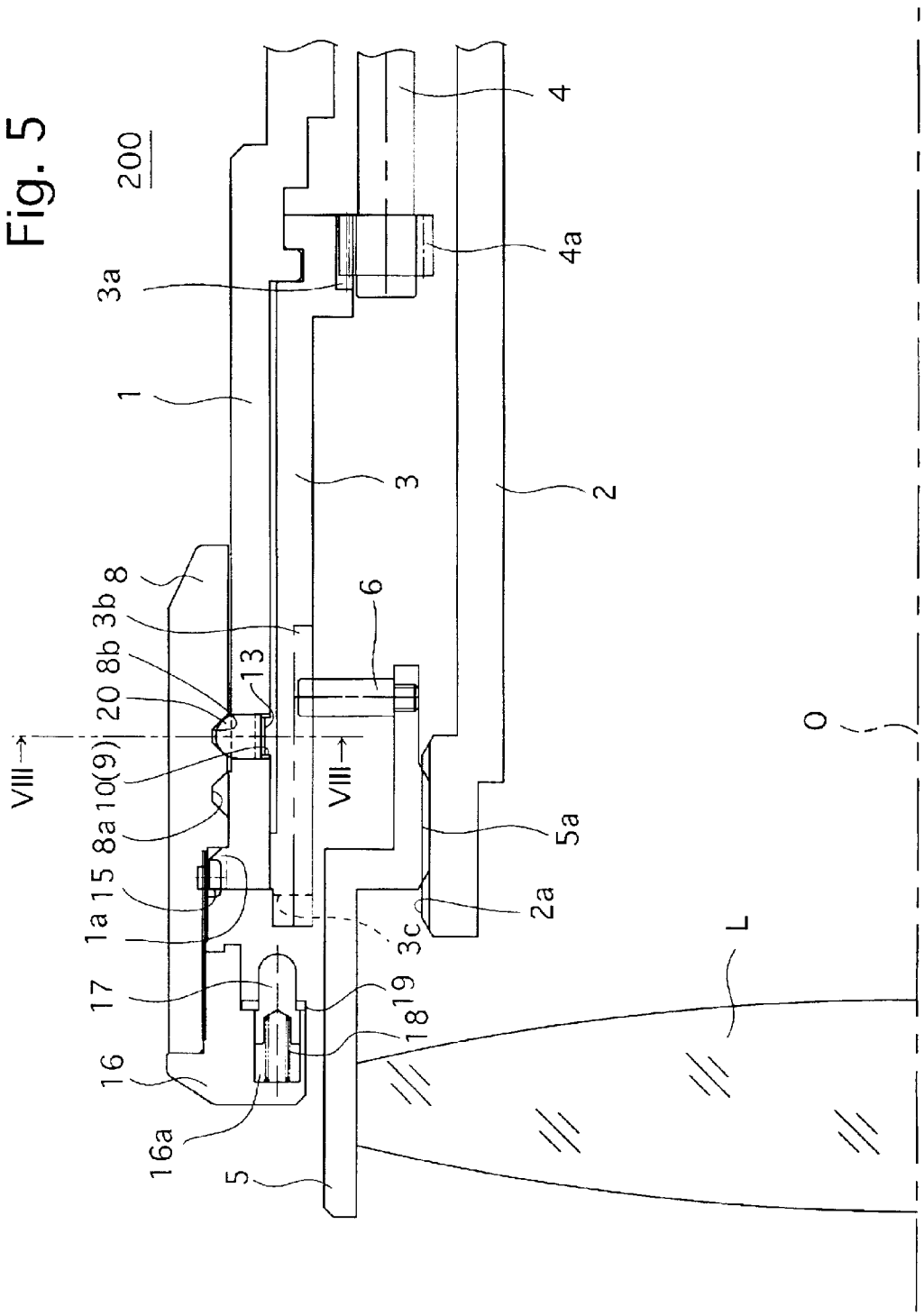
FIG. 5 is an axial cross sectional view of fundamental elements of a photographing lens barrel of an autofocus camera which is provided with a second embodiment of the click-stop mechanism according to the present invention, showing the fundamental elements above a photographing optical axis with the AF/MF switch ring set in the AF position thereof.
Figure 6:
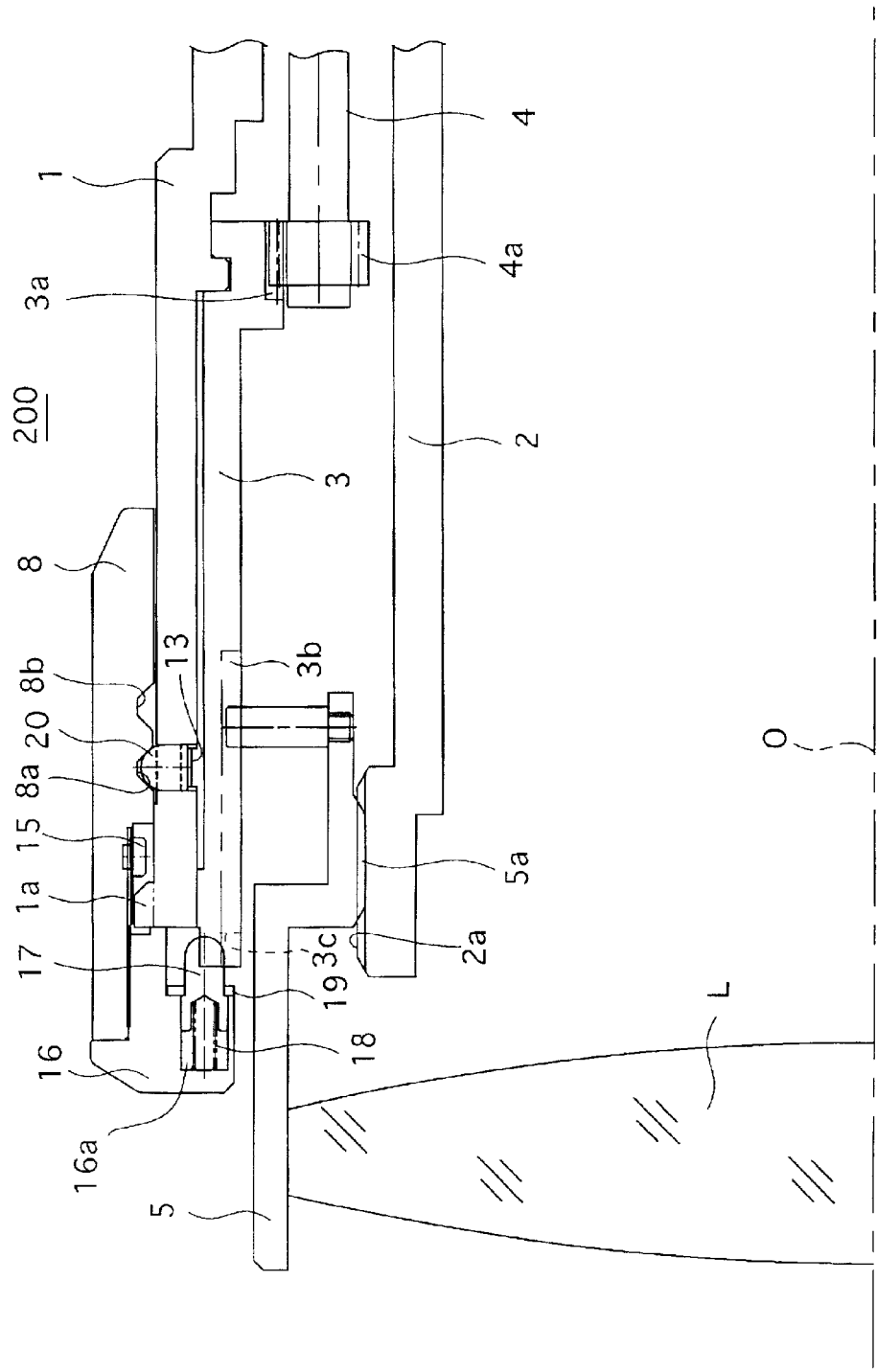
FIG. 6 is a view similar to that of FIG. 5 and shows the fundamental elements above the photographing optical axis with the AF/MF switch ring set in the MF position thereof.
Figure 7:
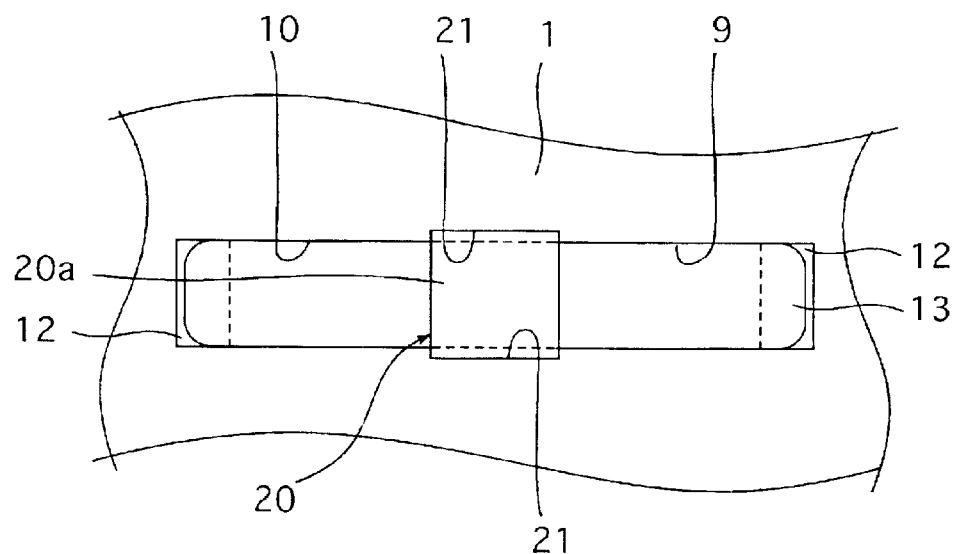
FIG. 7 is an enlarged plan view of a fundamental portion of the click-stop mechanism shown in FIGS. 5 and 6, showing a leaf spring, a click pin and a leaf spring insertion hole in which the leaf spring and the click pin are inserted.

The first stationary ring 1 is provided, at a portion thereof on which the AF/MF switch ring 8 is fitted, with a leaf spring insertion hole (leaf spring insertion recess) 9 which is elongated in a circumferential direction of the first stationary ring 1. As shown in FIGS. 3 and 4, the first stationary ring 1 is provided in the leaf spring insertion hole 9 with a through slot portion (leaf-spring-deformation allowance portion) 10 and a pair of stepped portions (support portions) 12 which are formed on opposite ends of the leaf spring insertion hole 9 in a circumferential direction of the first stationary ring 1. The through slot portion 10 and the pair of stepped portions 12 constitute the leaf spring insertion hole 9. The first stationary ring 1 is provided at a central part of the leaf spring insertion hole 9 therein with a pair of opposed recesses 11 which are recessed in opposite directions away from each other in the optical axis direction to hold a spherical click ball (engaging member) 14 therebetween in the leaf spring insertion hole 9 so that the click ball 14 can move only in a radial direction of the first stationary ring 1 along the pair of opposed recesses 11.

A leaf spring 13 is loosely inserted into (dropped into) the leaf spring insertion hole 9 so that the opposite ends of the leaf spring 13 are positioned on the pair of stepped portions 12 to be supported thereby, respectively. A central portion of the leaf spring 13 is positioned in the through slot portion 10, while the click ball 14 that is held in the leaf spring insertion hole 9 between the pair of opposed recesses 11 is positioned on the central portion of the leaf spring 13 to be supported thereby. The width of the leaf spring 13 (the width of the leaf spring insertion hole 9) is smaller than the diameter of the click ball 14 (i.e., the diameter of the peripheral surface of an imaginary cylinder which is partially defined by the surfaces of the pair of opposed recesses 11). The MF-state holding groove 8a, the AF-state holding groove 8b, the leaf spring insertion hole 9, the leaf spring 13 and the click ball 14 are fundamental elements of the first embodiment of the click-stop mechanism.

After the leaf spring 13 is dropped into the leaf spring insertion hole 9 and the click ball 14 is inserted into the leaf spring insertion hole 9 between the pair of opposed recesses 11, fitting the AF/MF switch ring 8 on the first stationary ring 1 and subsequently bringing the click ball 14 into engagement with either the MF-state holding groove 8a or the AF-state holding groove 8b completes assembly of the click-stop mechanism. Accordingly, no set screw is necessary to fix the leaf spring 13 to the first stationary ring 1. In this state, after assembly of the click-stop mechanism is completed, the leaf spring 13 is resiliently deformed in the leaf spring insertion hole 9 in a direction toward the optical axis O (downward as viewed in FIG. 4) as shown by solid lines in FIGS. 1, 2 and 4. The resilience of the leaf spring 13 pushes the click ball 14 radially outwards to thereby make it possible for the click ball 14 to be engaged in either the MF-state holding groove 8a or the AF-state holding groove 8b with a click action.

The AF/MF switch ring 8 is held in the AF position thereof (the position of the AF/MF switch ring 8 shown in FIG. 1) when the click ball 14 is engaged in the AF-state holding groove 8b, while the AF/MF switch ring 8 is held in the MF position thereof (the position of the AF/MF switch ring 8 shown in FIG. 2) when the click ball 14 is engaged in the MF-state holding groove 8a.

The AF/MF switch ring 8 is provided, on an inner peripheral surface thereof in front of the MF-state holding groove 8a, with pins 15 and the first stationary ring 1 is provided at the front end thereof with stoppers 1a. When the AF/MF switch ring 8 is in the AF position, the lock pins 15 are engaged with the stoppers 1a to prevent the AF/MF switch ring 8 from rotating about the optical axis O.

The photographing lens barrel 100 is provided between the AF/MF switch ring 8 and the first stationary ring 1 with a clutch mechanism for transferring rotation of the AF/MF switch ring 8 to the rotating ring 3 when the AF/MF switch ring 8 is in the MF position. The clutch mechanism has a clutch ring 16 fixed to the front end of the AF/MF switch ring 8. The clutch ring 16 is provided on a rear face thereof with a plurality of engaging pins 17 which are positioned at different circumferential positions in a circumferential direction of the clutch ring 16 to extend rearwards in the optical axis direction. The front ends of the plurality of engaging pins 17 are respectively inserted into a corresponding plurality of recesses 16a formed on a rear surface of the clutch ring 16. A plurality of compression helical springs 18 are respectively inserted into the plurality of recesses 16a to normally bias the plurality of engaging pins 17 rearwards. A pin retaining member 19 is fixed to the rear surface of the clutch ring 16 immediately behind the plurality of recesses 16a to prevent the plurality of engaging pins 17 from coming out of the plurality of recesses 16a. The clutch mechanism is provided with a plurality of engaging grooves 3c which are formed on a front surface of the rotating ring 3 to correspond to the plurality of the engaging pins 17 at different circumferential positions in a circumferential direction of the rotating ring 3. Moving the AF/MF switch ring 8 to the MF position causes the engaging pins 17 to be respectively engaged in the plurality of engaging grooves 3c so that the AF/MF switch ring 8 rotates about the optical axis O together with the rotating ring 3 as an integral member.

Accordingly, in a state shown in FIG. 1 in which the AF/MF switch ring 8 is in the AF position, rotating the drive shaft 4 by the aforementioned motor provided in the camera body causes the rotating ring 3 to rotate about the optical axis O. This rotation of the rotating ring 3 is transferred to the moving ring 5 via the rotation transfer groove 3b and the driving force transfer pin 6 to cause the moving ring 5, which supports the photographing lens group L, to move in the optical axis direction while rotating about the optical axis O due to engagement of the female thread portion 5a with the male thread portion 2a to adjust the focus state of the photographing lens group L.

On the other hand, in a state shown in FIG. 2 in which the AF/MF switch ring 8 is in the MF position, the lock pins 15 are disengaged from the stoppers 1a to allow the clutch ring 16 to be manually rotated, while the engaging pins 17 are engaged with the plurality of engaging grooves 3c so that the AF/MF switch ring 8 and the rotating ring 3 are coupled to each other in a rotational direction thereof. Accordingly, manually rotating the AF/MF switch ring 8 (the clutch ring 16) causes the moving ring 5, which supports the photographing lens group L, to move in the optical axis while rotating about the optical axis O to adjust the focus of the photographing lens group L.

According to the first embodiment of the click-stop mechanism, the leaf spring 13 is positioned in the first stationary ring 1 and is securely supported thereby without using a set screw only by placing the leaf spring 13 into the leaf spring insertion hole 9. This makes it possible to achieve a simple click-stop mechanism provided between the first stationary ring 1 and the AF/MF switch ring 8 without an increase in the number of elements of the click-stop mechanism.

Moreover, since the pair of opposite recesses 11 for receiving the click ball 14 are formed in the leaf spring insertion hole 9, the click ball 14 is movable only in a radial direction of the first stationary ring 1 along the pair of opposite recesses 11. This structure makes it possible for the AF/MF switch ring 8 to be positioned in either the AF position or the MF position with precision.

FIGS. 5 through 9 show the second embodiment of the click-stop mechanism.

Parts or elements of the second embodiment of the click-stop mechanism which are similar to those of the first embodiment of the click-stop mechanism are designated with the same reference numerals, and accordingly discussion about such similar parts or elements of the second embodiment of the click-stop mechanism is herein omitted.

The second embodiment of the click-stop mechanism 200 is substantially identical to the first embodiment of the click-stop mechanism 100 except that a click pin (engaging member) 20 (see FIG. 9) is used instead of the click ball 14 in the second embodiment of the click-stop mechanism.

Figure 8:
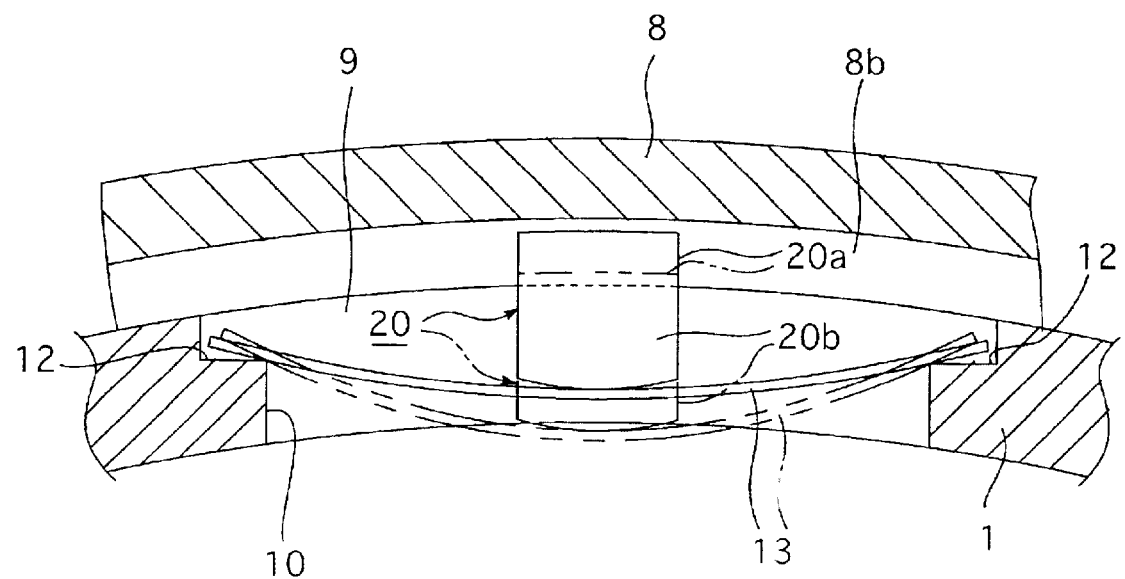
FIG. 8 is a cross sectional view of the click-stop mechanism, taken along VIII—VIII line shown in FIG. 5.
Figure 9:
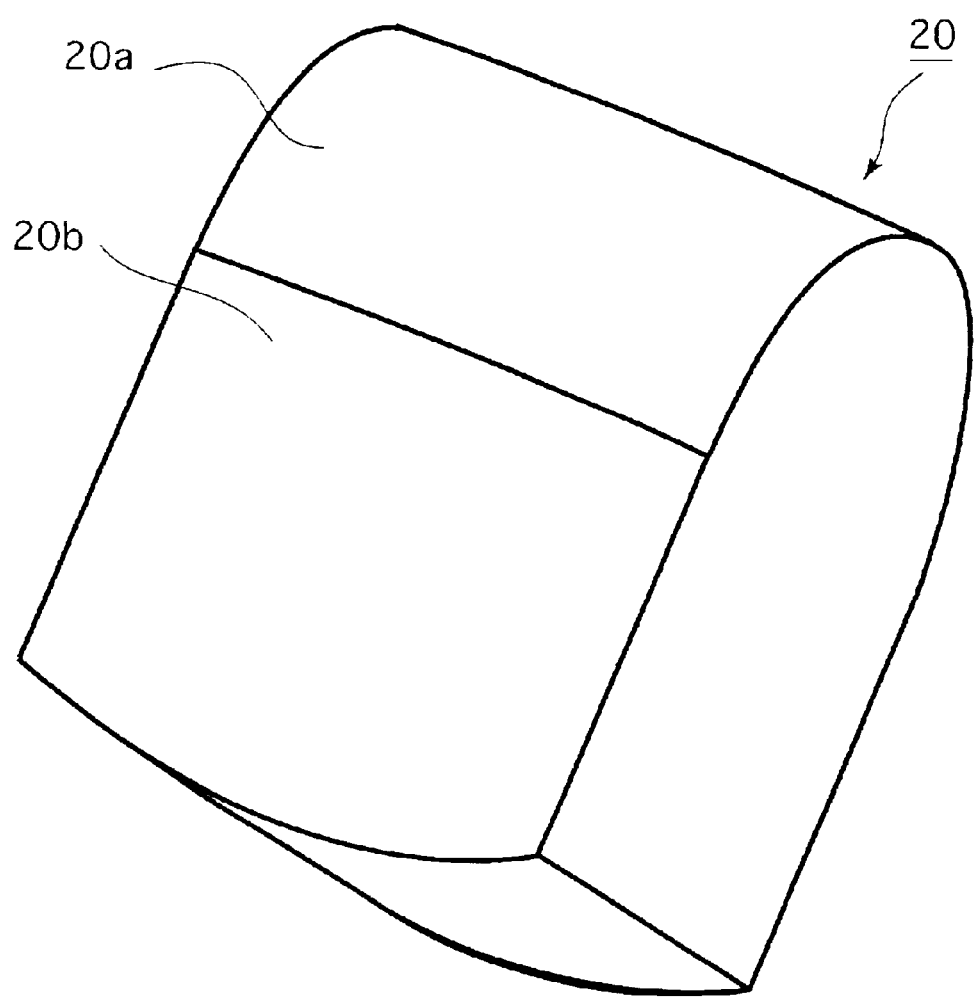
FIG. 9 is an enlarged perspective view of the click pin shown in FIGS. 5 through 8.

As shown in FIG. 9, the click pin 20 consists of a substantially semicolumnar portion 20a and a substantially rectangular portion 20b which are smoothly connected to each other with no stepped portion at the joint therebetween. The first stationary ring 1 in the second embodiment of the click-stop mechanism 200 is provided at the center of the leaf spring insertion hole 9 therein with a pair of opposed recesses 21 which are recessed in opposite directions away from each other in the optical axis direction to hold the click pin 20 therebetween in the leaf spring insertion hole 9 so that the click pin 20 can move only in a radial direction of the first stationary ring 1 along the pair of opposed recesses 21. As shown in FIG. 8, the click pin 20 is inserted into the leaf spring insertion hole 9 between the pair of opposed recesses 21 with the bottom of the rectangular portion 20b being positioned on the leaf spring 13. In this state where the click pin 20 is properly inserted into the leaf spring insertion hole 9 between the pair of opposed recesses 21, the ridge of the semicolumnar portion 20a extends substantially in the longitudinal direction of the MF-state holding groove 8a and the AF-state holding groove 8b (i.e., in a circumferential direction of the first stationary ring 1). The bottom surface of the rectangular portion 20b which remains in contact with the leaf spring 13 is curved to substantially correspond to a maximum curve of the resiliently-curved leaf spring 13.

In the second embodiment of the click-stop mechanism 200, after the leaf spring 13 is dropped into the leaf spring insertion hole 9 and the click pin 20 is inserted into the leaf spring insertion hole 9 between the pair of opposed recesses 11 in the right insertion direction, fitting the AF/MF switch ring 8 on the first stationary ring 1 and subsequently bringing the semicolumnar portion 20a of the click pin 20 into engagement with either the MF-state holding groove 8a or the AF-state holding groove 8b completes assembly of the click-stop mechanism.

When the click pin 20 is engaged in the AF-state holding groove 8b, the AF/MF switch ring 8 is held in the AF position thereof (the position of the AF/MF switch ring 8 shown in FIG. 5) with front and rear curved surfaces of the semicolumnar portion 20a being in line contact with front and rear beveled surfaces of the AF-state holding groove 8b, respectively. On the other hand, when the click pin 20 is engaged in the MF-state holding groove 8a, the AF/MF switch ring 8 is held in the MF position thereof (the position of the AF/MF switch ring 8 shown in FIG. 6) with front and rear curved surfaces of the semicolumnar portion 20a being in line contact with front and rear beveled surfaces of the MF-state holding groove 8a, respectively.

According to the second embodiment of the click-stop mechanism 200, upon moving the AF/MF switch ring 8 from the AF position to the MF position, or vice versa, an impact (shock) occurring between the click pin 20 and either holding groove 8a or 8b is dispersed because the front and rear curved surfaces of the semicolumnar portion 20a respectively come into linear contact with the front and rear beveled surfaces of either holding groove 8a or 8b. This makes the switching operation of the AF/MF switch ring 8 between the AF position and the MF position smoother than that of the first embodiment of the click-stop mechanism 100 which uses the click ball 14. In addition, as compared with the click ball 14 which comes in point contact with each of the front and rear beveled surfaces of either holding groove 8a or 8b, scratches are not easily made on each of the MF-state holding groove 8a and the AF-state holding groove 8b with the click pin 20. This makes a smooth rotating operation of the AF/MF switch ring 8 in the MF position about the optical axis O possible for a long term basis.

Figure 10:
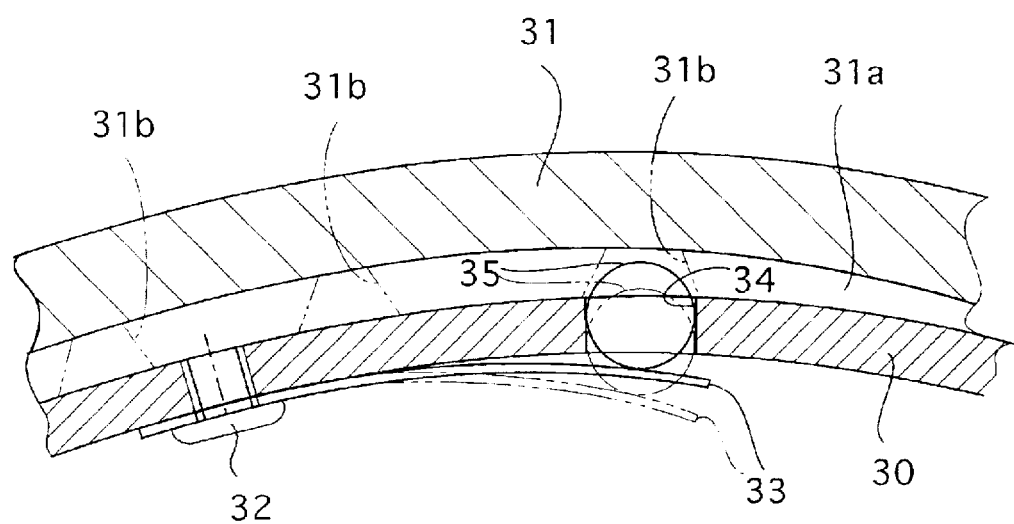
FIG. 10 is a transverse cross sectional view of a fundamental portion of a conventional click-stop mechanism.

Although each of the above described first and second embodiments of the click-stop mechanisms is applied to the AF/MF switch ring 8 that is moved in the optical axis direction to change the focusing mode of the autofocus camera between AF mode and MF mode, the present invention can also be applied to a select-dial switch ring which is rotated about an optical axis. Namely, in the click-stop mechanism using a select-dial switch ring, a series of click-stop grooves similar to the series of click-stop grooves 31b shown by two-dot chain lines in FIG. 10 can be formed on the select-dial switch ring to be arranged at predetermined intervals in a circumferential direction of the AF/MF switch ring so that the series of click-stop grooves are selectively engaged with the click ball 14 or the click pin 20 to position the switch ring at one of the predetermined rotational positions (angular positions). In addition, it can be understood by those skilled in the art that the present invention can also be applied to another type of switch ring which is rotated about the optical axis while moving in the optical axis direction.

Although the AF/MF switch ring 8 is provided with the MF-state holding groove 8a and the AF-state holding groove 8b while the first stationary ring 1 is provided with the leaf spring insertion hole 9 in each of the first and second embodiments of the click-stop mechanisms, the first stationary ring 1 can be provided with the MF-state holding groove 8a and the AF-state holding groove 8b while the AF/MF switch ring 8 can be provided with the leaf spring insertion hole 9.

Although each of the first and second embodiments of the click-stop mechanisms is provided between two annular members (i.e., the first stationary ring 1 and the AF/MF switch ring 8), the present invention can be applied not only to such two annular members but also to two non-annular members.

As can be understood from the foregoing, according to the present invention, a simple click-stop mechanism provided between two members, one of which is slidably fitted on the other, wherein the number of elements of the click-stop mechanism is small while the click-stop mechanism can be easily assembled is achieved.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A click-stop mechanism provided between two members, one of said two members being slidably fitted on the other of said two members, said click-stop mechanism comprising:

an engaging groove formed on one of opposed surfaces of said two members;

a leaf spring insertion recess formed on the other of opposed surfaces of said two members, a leaf spring located in said leaf spring insertion recess; and a click member provided separately from said leaf spring, said click member positioned on said leaf spring and engaged in said engaging groove such that said click member is configured to be supported by said engaging groove and the biasing force of said leaf spring so as to allow said click member to be movable in a direction normal to the sliding movement of said two members.

2. The click-stop mechanism according to claim 1, wherein said leaf spring insertion recess comprises:

a pair of support portions formed in said leaf spring insertion recess to support opposite ends of said leaf spring, respectively; and a leaf-spring-deformation allowance portion which is positioned in said leaf spring insertion recess between said pair of support portions to allow said leaf spring to be resiliently deformed.

3. The click-stop mechanism according to claim 2, wherein said other of said opposed surfaces of said two members, on which said leaf spring insertion recess is formed, comprises a click member guide portion which allows said click member to move only in directions corresponding to directions of engagement and disengagement of said click member in and out from said engaging groove.

4. The click-stop mechanism according to claim 1, wherein said engaging groove comprises a plurality of engaging grooves which are formed on said one of said opposed surfaces of said two members at different positions in a direction of relative movement of said two members, and wherein said click member is selectively engaged in said plurality of engaging grooves.

5. The click-stop mechanism according to claim 1, wherein said click member is formed as a spherical click ball.

6. The click-stop mechanism according to claim 1, wherein a portion of said click member which is engaged in said engaging groove comprises a substantially semicolumnar portion having a ridge extending substantially in a longitudinal direction of said engaging groove.

7. The click-stop mechanism according to claim 1, wherein each of said two members comprises an annular member provided in a lens barrel.

8. The click-stop mechanism according to claim 7, wherein at least one of said two members is movable relative to the other in an optical axis direction of said lens barrel, and wherein said engaging groove comprises a plurality of engaging grooves which are formed on said one of said opposed surfaces of said two members at different positions in said optical axis direction.

9. The click-stop mechanism according to claim 8, wherein said lens barrel is used as a photographing lens barrel of an autofocus camera, and wherein one of said two members serves as a switch ring which is moved in said optical axis direction between an AF position and an MF position to change a focusing mode of said autofocus camera between an AF mode and an ME mode, respectively.

10. The click-stop mechanism according to claim 7, wherein at least one of said two members is rotatable about an optical axis of said lens barrel relative to the other, and wherein said engaging groove comprises a plurality of engaging grooves which are formed on said one of said opposed surfaces of said two members at different positions in a circumferential direction about said optical axis.

11. The click-stop mechanism according to claim 1, wherein said engaging groove has a substantially V-shaped cross section.

12. The click-stop mechanism according to claim 2, wherein said pair of support portions comprise a pair of stepped portions formed on said one of said opposed surfaces of said two members in said leaf spring insertion recess to respectively support said opposite ends of said leaf spring.

13. The click-stop mechanism according to claim 3, wherein said click member guide portion comprises a pair of opposed recesses formed in said leaf spring insertion recess to hold said click member therebetween in said leaf spring insertion recess so that said click member can move only along said pair of opposed recesses.

14. A click-stop mechanism provided between two members, one of said two members being positioned on the other of said two members to be slidable thereon, said click-stop mechanism comprising:

two engaging grooves formed on one of opposed surfaces of said two members;

a leaf spring insertion hole recess formed on the other of said opposed surfaces of said two members;

a leaf spring located in said leaf spring insertion recess; and a click member provided separately from said leaf spring, said click member positioned on said leaf spring and selectively engaged in one of said two engaging grooves such that said click member is configured to be supported by said one engaging groove and the biasing force of said leaf spring so as to allow said click member to be movable in a direction normal to the sliding movement of said two members.

* * * * *